(12) United States Patent
Fransham et al.

(10) Patent No.: US 12,065,620 B2
(45) Date of Patent: *Aug. 20, 2024

(54) CONTROLLED BLENDING OF BIODIESEL INTO DISTILLATE STREAMS

(71) Applicant: Texon LP, Houston, TX (US)

(72) Inventors: Robert Fransham, Houston, TX (US); John Colin Robbins, Houston, TX (US)

(73) Assignee: Texon Midstream, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,992

(22) Filed: Jan. 4, 2023

(65) Prior Publication Data

US 2023/0257668 A1   Aug. 17, 2023

Related U.S. Application Data

(63) Continuation of application No. 17/117,233, filed on Dec. 10, 2020, now Pat. No. 11,578,282, which is a continuation-in-part of application No. 15/885,983, filed on Feb. 1, 2018, now Pat. No. 10,889,772.

(60) Provisional application No. 62/456,980, filed on Feb. 9, 2017.

(51) Int. Cl.
*C10L 1/04* (2006.01)
*C10G 7/12* (2006.01)
*G05B 19/406* (2006.01)
*G05D 11/13* (2006.01)

(52) U.S. Cl.
CPC .................. *C10L 1/04* (2013.01); *C10G 7/12* (2013.01); *G05B 19/406* (2013.01); *G05D 11/132* (2013.01); *C10G 2400/04* (2013.01); *C10G 2400/08* (2013.01); *C10L 2200/0476* (2013.01); *C10L 2290/24* (2013.01); *C10L 2290/543* (2013.01); *C10L 2290/58* (2013.01); *C10L 2290/60* (2013.01)

(58) Field of Classification Search
CPC .... C10L 1/026; C10L 1/04; C10L 2200/0476; C10L 2290/24; C10L 2290/543; C10L 2290/58; C10L 2290/60; C10G 2400/04; C10G 2400/08; C10G 7/12; G05B 19/406; G05D 11/131; G05D 11/132
See application file for complete search history.

(56) References Cited

U.S. PATENT DOCUMENTS

| | | |
|---|---|---|
| 6,679,302 B1 | 1/2004 | Mattingly et al. |
| 7,631,671 B2 | 12/2009 | Mattingly et al. |
| 2006/0074256 A1 | 4/2006 | Alasti |
| 2006/0213554 A1 | 9/2006 | Welch |

(Continued)

OTHER PUBLICATIONS

Texon LP, International Application No. PCT/US2018/016358 filed Feb. 1, 2018, International Search Report and Written Opinion, ISA/US, Apr. 23, 2018, 17 pages.

(Continued)

*Primary Examiner* — Latosha Hines
(74) *Attorney, Agent, or Firm* — Clark G. Sullivan

(57) ABSTRACT

Methods are provided for accurately blending biodiesel into distillate streams to achieve a pre-determined percentage of biodiesel in the distillate, applicable to wild-type distillate streams as well as distillate streams that already contain some percentage of biodiesel.

17 Claims, 1 Drawing Sheet

(56) References Cited

U.S. PATENT DOCUMENTS

| | | |
|---|---|---|
| 2009/0316139 A1 | 12/2009 | Shrestha et al. |
| 2010/0039884 A1* | 2/2010 | Weathers ............. G05D 11/006 366/152.2 |
| 2010/0313467 A1 | 12/2010 | Lake et al. |
| 2011/0060497 A1 | 3/2011 | Cummings et al. |
| 2011/0138679 A1 | 6/2011 | Wells et al. |
| 2015/0053304 A1* | 2/2015 | Huwyler ................ G06Q 40/04 705/37 |
| 2016/0047325 A1 | 2/2016 | Ahlinder |
| 2019/0359905 A1 | 11/2019 | Lanni |

OTHER PUBLICATIONS

Kram J, No need to splash, Biodiesel Magazine (Jan. 17, 2008).
Multi-Stream Blender Description and Technical Specifications; Honeywell Enraf Americas Inc.; Mar. 2009 Honeywell International Inc.

* cited by examiner

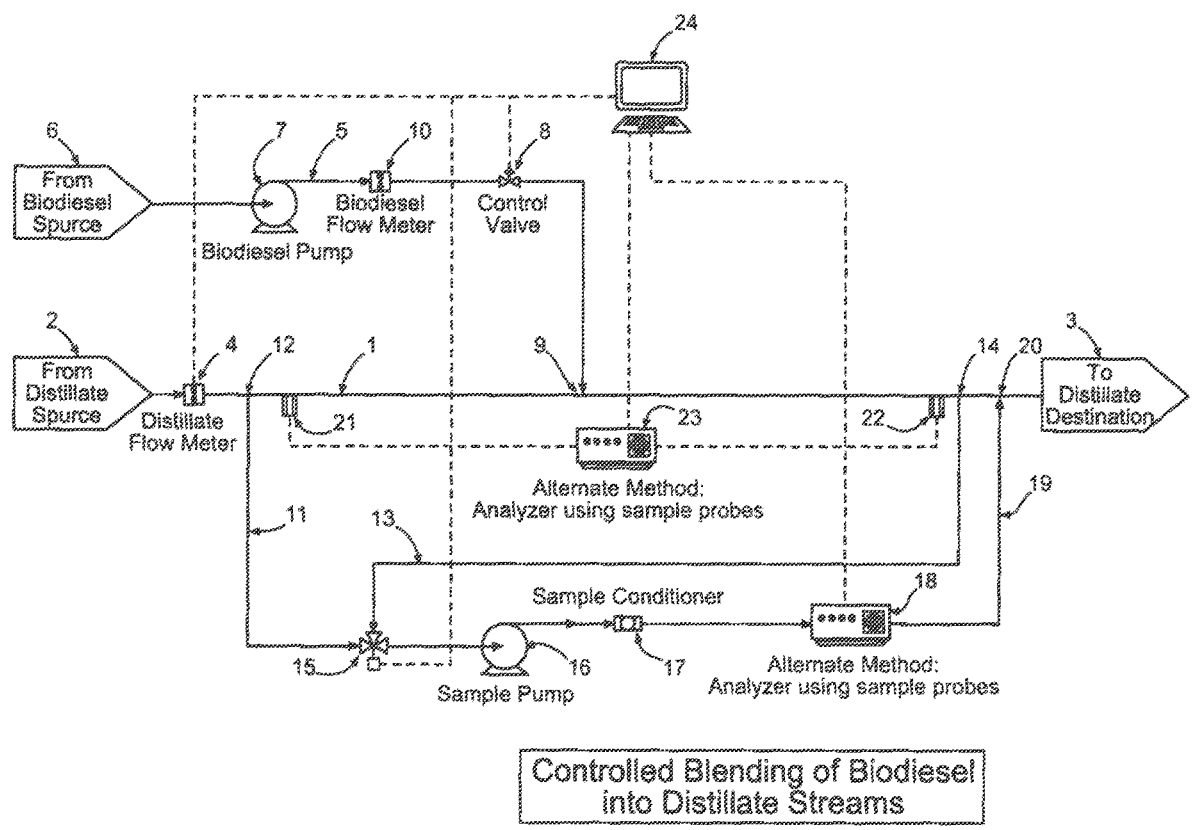

CONTROLLED BLENDING OF BIODIESEL INTO DISTILLATE STREAMS

FIELD OF THE INVENTION

The present invention relates to biodiesel, and to methods for maximizing the utilization of biodiesel fuels in distillates such as diesel fuel and fuel oil.

BACKGROUND OF THE INVENTION

Petroleum pipelines are a critical element of world-wide fuel distribution networks, delivering refined fuel products from ports and refineries to storage facilities in various geographic locations. Through an intricate network of coordinated deliveries from multiple sources, batches of varying grades and types of fuel travel through these pipelines to predetermined locations. Tank farms are used to store fuel delivered through these pipelines, and to distribute the fuel to other tank farms and ultimately to tanker trucks that deliver the fuel to end user outlets such as retail fuel stations and airports. Petroleum products are typically dispensed to tanker trucks in what is known as a rack, which usually comprises several outlet ports to which different gasoline and diesel transports may be coupled.

The United States Environmental Protection Agency (EPA) and other regulatory authorities have promulgated regulations and fuel standards that mandate a certain amount of biodiesel that must be blended with diesel each year. These regulations generally apply in aggregate for the year. However, due to the effects of cold temperature on the diesel properties, most biodiesel blending occurs in the warmest months of cold climate geographic areas. State and local regulations also establish labeling requirements for diesel based on the amount of biodiesel blended with the diesel that vary by the region in which the diesel will be dispensed and sold.

Biodiesel is often blended with diesel at tank farms, racks, and retail locations. This blending can occur in-line, so that biodiesel is added directly to a line that is transporting the diesel to a terminal or in-line delivery to a tank truck. Alternatively, blending can occur in batches, as when biodiesel is added to a storage tank or tank truck. The addition of biodiesel to a storage tank in a separate batch from the diesel is referred to as "tank blending." The addition of biodiesel to a tank truck in a separate batch from the diesel is referred to as "splash blending."

As explained by Kram J, *No need to splash*, BIODIESEL MAGAZINE (Jan. 17, 2008), blending of biodiesel into diesel fuel is typically governed by percentage limits. Thus, when blending on a pipeline into a wild diesel stream to which no biodiesel has been added, a pipeline operator simply blends biodiesel to the target percentage, using a process known as "ratio blending." An exemplary system for carrying out this ratio blending is the Multi-Stream Blender™ by Honeywell Enraf Americas Inc. However, this type of "ratio blending" is not possible when biodiesel has already been added to the stream, because ratio blending to a mixed biodiesel/diesel stream could cause the stream to exceed its biodiesel percentage target.

The same holds true for splash building, which is commonly based on the volumes or weights of diesel and biodiesel added to a tanker truck. Using the volume method, a truck will receive a measured volume of diesel, and then add a measured volume of biodiesel to complete the target blend. Using the weight method, a truck is often weighed on a scale, filled, weighed again and the difference between the weights is the amount of biodiesel that's been added. To make a blend such as B5 that contains 5% biodiesel, a proportional volume or weight of biodiesel is splash blended with the petroleum diesel. Once again, this process cannot be used if the diesel already contains biodiesel, because of the potential for exceeding the percentage limit on biodiesel in the blend.

Biodiesel blending can be especially challenging on the multi-product pipelines that carry the vast majority of fuels from ports and refineries, because of the potential for mixing biodiesel with incompatible fuels, particularly aviation turbine fuels. Because biodiesel contamination of aviation turbine fuel is limited to almost undetectable levels in ASTM specification D1655, common carrier pipelines have responded by banning biodiesel-containing distillate on most of their line segments, thus relegating biodiesel blending to splash blending or tank blending processes individually at the tank farms and retail locations at the end of the pipelines.

Therefore, it is an object of the present invention to provide more versatile methods for blending biodiesel into diesel streams and other fuel streams where biodiesel is permitted, that can be used regardless of the biodiesel content of the stream, to achieve target concentrations of biodiesel in the blend.

Another object is to provide automated methods for monitoring the biodiesel content of a diesel or other fuel stream, and for controlling the blending of biodiesel into the diesel or other fuel stream based on the biodiesel content based on real-time biodiesel percentage measurements.

Another object of the present invention is to facilitate biodiesel blending into diesel and other fuel streams to achieve defined biodiesel limits in the diesel or other fuel.

Still another object of the present invention is to facilitate blending of biodiesel into distillate streams along multi-product fuel pipelines, including pipelines that carry aviation turbine fuel.

SUMMARY OF INVENTION

Thus, in a first principal embodiment the invention provides an automated method of blending biodiesel into a distillate stream to achieve a target biodiesel content comprising: (a) providing a distillate stream having a distillate stream flow rate; (b) providing a supply of biodiesel having a biodiesel stream flow rate in liquid communication with said distillate stream, separated from said distillate stream by a regulating valve that is under the control of a central processing unit; (c) providing a target biodiesel content for said distillate stream; (d) periodically measuring an actual biodiesel content in said distillate stream, upstream and/or downstream of said regulating valve; (e) periodically transmitting said actual biodiesel content to said central processing unit; (f) periodically calculating in said central processing unit a target blending rate at which biodiesel can be blended into said distillate stream to achieve the target biodiesel content; and (g) modulating said regulating valve to blend biodiesel into said distillate stream at said target blending rate.

In a second principal embodiment the invention provides an automated system for blending biodiesel into a distillate stream to achieve a target biodiesel content comprising: (a) a distillate stream having a distillate stream flow rate; (b) a supply of biodiesel in liquid communication with said distillate stream, separated from said distillate stream by a regulating valve that is under the control of a central processing unit; (c) a target biodiesel content for said distillate stream accessible by said central processing unit; (d) an analyzer for measuring an actual biodiesel content of said distillate stream, upstream and/or downstream of said valve; (e) means for transmitting said actual biodiesel content to said central processing unit; (f) means for calculating in said central processing unit a target rate at which biodiesel can be blended into said distillate stream to achieve the target biodiesel content; and (g) means for periodically modulating said regulating valve to blend biodiesel into said distillate stream at said target blending rate.

In a third principal embodiment an automated method of blending biodiesel into a distillate stream so as not to exceed a maximum biodiesel content comprising: (a) providing a distillate stream having a distillate stream flow rate; (b) providing a supply of biodiesel having a biodiesel stream flow rate in liquid communication with said distillate stream, separated from said distillate stream by a regulating valve that is under the control of a central processing unit; (c) providing a maximum biodiesel content for said distillate stream; (d) periodically measuring an actual biodiesel content in said distillate stream, upstream and/or downstream of said regulating valve; (e) periodically transmitting said actual biodiesel content to said central processing unit; (f) periodically calculating in said central processing unit a maximum flow rate at which biodiesel can be blended into said distillate stream so as not to exceed the maximum biodiesel content; and (g) modulating said regulating valve to blend biodiesel into said distillate stream at or below said maximum blending rate.

In a fourth principal embodiment the invention provides an automated system for blending biodiesel into a distillate stream so as not to exceed a maximum biodiesel content comprising: (a) a distillate stream having a distillate stream flow rate; (b) a supply of biodiesel in liquid communication with said distillate stream, separated from said distillate stream by a regulating valve that is under the control of a central processing unit; (c) a maximum biodiesel content for said distillate stream accessible by said central processing unit; (d) an analyzer for measuring an actual biodiesel content of said distillate stream, upstream and/or downstream of said valve; (e) means for transmitting said actual biodiesel content to said central processing unit; (f) means for calculating in said central processing unit a maximum rate at which biodiesel can be blended into said distillate stream so as not to exceed the target biodiesel content; and (g) means for periodically modulating said regulating valve to blend biodiesel into said distillate stream at or below said maximum blending rate.

Additional advantages of the invention are set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this specification, illustrate several embodiments of the invention and together with the description serve to explain the principles of the invention.

FIG. 1 is a schematic drawing of the layout of a representative biodiesel blending system.

DETAILED DESCRIPTION

Definitions and Use of Terms

As used in this specification and in the claims which follow, the singular forms "a," "an" and "the" include plural referents unless the context clearly dictates otherwise.

As used in this specification and in the claims which follow, the word "comprise" and variations of the word, such as "comprising" and "comprises," means "including but not limited to," and is not intended to exclude, for example, other additives, components, integers or steps. When an element is described as comprising a plurality of components, steps or conditions, it will be understood that the element can also be described as comprising any combination of such plurality, or "consisting of" or "consisting essentially of" the plurality or combination of components, steps or conditions.

Throughout the patent application, wherever an analysis of petroleum or biodiesel is disclosed according to a particular standard, such as an EPA regulation or a standard promulgated by the American Society for Testing and Materials ("ASTM"), it will be understood that such standard is the standard in effect on Jan. 1, 2017. However, it will also be understood that a product that satisfies a particular ASTM standard need not have been tested according to that standard. Thus, for example, biodiesel defined by the Jan. 1, 2017, version of ASTM Standard D6751 covers biodiesel that meets this standard, regardless of whether it was tested for actual compliance with this standard.

When ranges are given by specifying the lower end of a range separately from the upper end of the range, or specifying particular numerical values, it will be understood that a separate range can be defined by selectively combining any of the lower end variables, upper end variables, and particular numerical values that is mathematically possible. In like manner, when a range is defined as spanning from one endpoint to another, the range will be understood also to encompass a span between and excluding the two endpoints.

"Biodiesel" refers generally to a fuel source comprised of mono-alkyl esters of long chain fatty acids derived from vegetable oils or animal fats that has been chemically processed to remove glycerin. The mono-alkyl esters are preferably comprised predominantly (i.e. greater than 80%, 90%, 95%, or 98%) or essentially of mono-methyl-esters of long chain fatty acids. A particularly preferred biodiesel for use in the current invention is referred to as B100, and is defined according to ASTM Standard D6751. The biodiesel can be Grade No. 1-B S15 (A special purpose biodiesel blendstock intended for use in middle distillate fuel applications which can be sensitive to the presence of partially reacted glycerides, including those applications requiring good low temperature operability, and also requiring a fuel blend component with 15 ppm sulfur (maximum)), Grade No. 1-B S500 (A special purpose biodiesel blendstock intended for use in middle distillate fuel applications which can be sensitive to the presence of partially reacted glycerides, including those applications requiring good low temperature operability, and also requiring a fuel blend component with 500 ppm sulfur (maximum)), Grade No. 2-B S15 (A general purpose biodiesel blendstock intended for use in middle distillate fuel applications that require a fuel blend component with 15 ppm sulfur (maximum)), or Grade No. 2-B S500 (A general purpose biodiesel blendstock intended for use in middle distillate fuel applications that require a fuel blend component with 500 ppm sulfur (maximum)). A preferred biodiesel for use in the present invention is B100 (i.e. 100% biodiesel), although biodiesel which has already been blended with diesel, such as B99, can also be used as the biodiesel.

The term "distillate" as used herein refers to those fuels commonly referred to as "middle distillates" in the petroleum industry, with the exception of aviation turbine fuel. "Middle distillates" is a term commonly assigned to petroleum products obtained in the "middle" boiling range from about 180° C.-360° C. during the process of crude oil distillation. They are also called middle distillates because the products are removed at mid-height in the distillation tower during the multi-stage process of thermal separation. A middle distillate is a clear, colorless to light yellow, combustible liquid. It typically has between eleven and eighteen carbon atoms, a density of not more than 0.876 kg/l at 15° C., and a flashpoint above 38° C. Middle distillates primarily include diesel fuel, marine fuels, non-aviation turbine fuel, heating oil, and kerosene.

The term "diesel fuel" as used herein means a petroleum-derived liquid fuel used in diesel engines, whose fuel ignition takes place without any spark as a result of compression of the inlet air mixture and then injection of fuel. Diesel fuel is a mixture of hydrocarbons with boiling points in the range of 200 to 380° C. Diesel fuel utilized in the present invention preferably satisfies the testing requirements specified in ASTM D975. The diesel fuel can be Grade No. 1-D S15 (a special-purpose, light middle distillate fuel for use in diesel engine applications requiring a fuel with 15 ppm sulfur (maximum) and higher volatility than that provided by Grade No. 2-D S15 fuel), Grade No. 1-D S500 (a special-purpose, light middle distillate fuel for use in diesel engine applications requiring a fuel with 500 ppm sulfur (maximum) and higher volatility than that provided by Grade No. 2-D S500 fuel), Grade No. 1-D S5000 (a special-purpose, light middle distillate fuel for use in diesel engine applications requiring a fuel with 5000 ppm sulfur (maximum) and higher volatility than that provided by Grade No. 2-D S5000 fuels), Grade No. 2-D S15 (a general purpose, middle distillate fuel for use in diesel engine applications requiring a fuel with 15 ppm sulfur (maximum)). It is especially suitable for use in applications with conditions of varying speed and load), Grade No. 2-D S500 (a general-purpose, middle distillate fuel for use in diesel engine applications requiring a fuel with 500 ppm sulfur (maximum). It is especially suitable for use in applications with conditions of varying speed and load), Grade No. 2-D S5000 (a general-purpose, middle distillate fuel for use in diesel engine applications requiring a fuel with 5000 ppm sulfur (maximum), especially in conditions of varying speed and load), or Grade No. 4-D (a heavy distillate fuel, or a blend of distillate and residual oil, for use in low- and medium-speed diesel engines in applications involving predominantly constant speed and load).

The term "heating oil" refers to fuel oil intended for use in various types of fuel-oil-burning equipment under various climatic and operating conditions. Heating oil preferably satisfies the specifications described in ASTM D396, and includes Grades No. 1 S5000, No. 1 S500, No. 1 S15, No. 2 S5000, No. 2 S500, and No. 2 S15 (middle distillate fuels for use in domestic and small industrial burners). Grades No. 1 S5000, No. 1 S500, and No. 1 S15 are particularly adapted to vaporizing type burners or where storage conditions require low pour point fuel). Heating oil also includes Grades B6-B20 S5000, B6-B20 S500, and B6-B20 S15 (middle distillate fuel/biodiesel blends for use in domestic and small industrial burners), Grades No. 4 (Light) and No. 4 (heavy distillate fuels or middle distillate/residual fuel blends used in commercial/industrial burners equipped for this viscosity range), Grades No. 5 (Light), No. 5 (Heavy), and No. 6 (residual fuels of increasing viscosity and boiling range, used in industrial burners). Kerosene also has its commonly understood meaning, although it will preferably satisfy D975 1D, S15 and S500 for motor fuel application, and ASTM D3699 for burner applications (although biodiesel blending is not commonly practiced with burner kerosene).

The terms "distillate," "diesel," "marine fuel," "heating oil," "kerosene," and "non-aviation turbine fuel" when used herein refer to such products before and after blending with biodiesel. Other more specific terms can be used to refer to distillates that have been blended with biodiesel, such as "blended distillate" or "biodiesel/distillate blend." Biodiesel/diesel blends preferably satisfy the ASTM D975 specifications for "diesel" provided herein when the percentage of biodiesel in the blend does not exceed 5 vol %. A 5 vol % biodiesel/diesel blend is commonly called B5 diesel or B5 biodiesel blend. In one embodiment, the biodiesel is blended into the diesel stream up to 5 vol %, although any blend percentage can be adopted based on the needs of the downstream user. In another embodiment, the blended stream comprises from 6 vol % to 20 vol % biodiesel (B6 to B20), and the blended product satisfies the testing requirements specified in ASTM D7467.

"Calculation" means the use of a mathematical algorithm to determine a value, and may be by a programmed software, a hardwired algorithm, or mental means.

"Density" means the density of a substance as a function of mass per unit volume. The density can be reported directly, in terms of mass per unit volume, or indirectly using measures such as specific gravity.

"Distillate stream" means a stream of distillate that is flowing through a pipeline or other conduit.

"Flow rate" means the volume of a fluid that flows past a given point over a given period of time.

"Fluid communication" refers to the linkage of a pipeline to a source of a fluid. Optionally the linkage may be through a channel that can be closed or whose flow may be modulated as by a valve. The linkage may be by any of the following: a door or window on the side of the pipeline; a branching pipe in the pipeline; an injection-facilitating fixture in a joint of the pipeline; a smaller secondary pipe that extends into the interior of the pipeline; or any other means that permits a fluid to flow into the pipeline. Optionally the flow may be constant, variable, or intermittent. In certain preferred embodiments of the invention the fluid flow into the pipeline by means of this linkage is capable of being modulated or stopped.

"Information processing unit" and "IPU" means a computational unit that is useful for at least one of accessing, receiving, processing, distributing and storing data. The IPU may receive data either passively or by affirmatively soliciting or searching for data on a separate information system. When an IPU is modified by the term "an," it will be understood that the invention contemplates that one or more IPU's may perform the function described for the IPU.

"Informational database" and "IDB" means an organized collection of information. As used herein the term includes spreadsheets, look-up tables, and dedicated database applications, and includes both electronic and hard copy databases. When an IDB is modified by the term "an," it will be understood that the invention contemplates that one or more IDB's may perform the function described for the IDB.

"Blending" as used with respect to a pipeline means insertion of a fluid into a pipeline.

"Actual blending rate" means the actual—as opposed to predicted—flow rate of the fluid into the pipeline during a blending operation.

"Biodiesel content" means biodiesel measured as a percentage of total hydrocarbon volume, preferably rounded to the nearest 1%.

"Obtaining" data or other information means acquiring such information. In some preferred embodiments information is obtained by making physical measurements. In other preferred embodiments information is obtained by receiving measurement data from a separate source. In still other preferred embodiments information is obtained from an in-house look-up table or databank. The term obtaining is to be understood in its broadest sense. The information obtained should also be understood in a broad sense, and may include values for physical parameters, regulatory guidelines, correlation tables for fuel properties, availability of distillate or biodiesel, and other types of information.

"Pooled supply" means a reservoir or otherwise collected reserve of a fluid intended for use in mixing. The term includes pooled supplies for any of the following: distillates, biodiesel, hydrocarbons, and other fuel components.

"Pre-defined limit" means a predetermined boundary value for a parameter, where the source of the boundary value is a regulation, a company's policy, or an operator's professional judgment. The term "pre-defined limit" is used herein particularly with respect to biodiesel content in distillate fuels.

"Tank farm" means any facility that contains a number of large storage tanks for petroleum products, typically including loading racks from which tanker trucks are filled. The tanks may contain one or more types and grades of gasoline, including reformulated gasoline, and may also contain in pure form or in composite fluids, biodiesel, distillates or other petroleum products.

"Target rate" means a desired rate of fluid flow.

"Variable rate" means a rate of fluid flow that changes over time.

Principal Embodiments

The invention is described herein in terms of principal embodiments and subembodiments. It will be understood that each of the subembodiments can modify any of the principal embodiments, unless such modification is logically inconsistent or expressly disallowed in this document. It will be further understood that the principal embodiments can be combined in any manner, and that the subembodiments can be combined in any manner to further modify any of the principal embodiments, unless such combination is logically inconsistent or expressly disallowed in this document.

In a first principal embodiment the invention provides an automated method of blending biodiesel into a distillate stream to achieve a target biodiesel content comprising: (a) providing a distillate stream having a distillate stream flow rate; (b) providing a supply of biodiesel having a biodiesel stream flow rate in liquid communication with said distillate stream, separated from said distillate stream by a regulating valve that is under the control of a central processing unit; (c) providing a target biodiesel content for said distillate stream; (d) periodically measuring an actual biodiesel content in said distillate stream, upstream and/or downstream of said regulating valve; (e) periodically transmitting said actual biodiesel content to said central processing unit; (f) periodically calculating in said central processing unit a target blending rate at which biodiesel can be blended into said distillate stream to achieve the target biodiesel content; and (g) modulating said regulating valve to blend biodiesel into said distillate stream at said target blending rate.

In a second principal embodiment the invention provides an automated system for blending biodiesel into a distillate stream to achieve a target biodiesel content comprising: (a) a distillate stream having a distillate stream flow rate; (b) a supply of biodiesel in liquid communication with said distillate stream, separated from said distillate stream by a regulating valve that is under the control of a central processing unit; (c) a target biodiesel content for said distillate stream accessible by said central processing unit; (d) an analyzer for measuring an actual biodiesel content of said distillate stream, upstream and/or downstream of said valve; (e) means for transmitting said actual biodiesel content to said central processing unit; (f) means for calculating in said central processing unit a target rate at which biodiesel can be blended into said distillate stream to achieve the target biodiesel content; and (g) means for periodically modulating said regulating valve to blend biodiesel into said distillate stream at said target blending rate.

In a third principal embodiment an automated method of blending biodiesel into a distillate stream so as not to exceed a maximum biodiesel content comprising: (a) providing a distillate stream having a distillate stream flow rate; (b) providing a supply of biodiesel having a biodiesel stream flow rate in liquid communication with said distillate stream, separated from said distillate stream by a regulating valve that is under the control of a central processing unit; (c) providing a maximum biodiesel content for said distillate stream; (d) periodically measuring an actual biodiesel content in said distillate stream, upstream and/or downstream of said regulating valve; (e) periodically transmitting said actual biodiesel content to said central processing unit; (f) periodically calculating in said central processing unit a maximum flow rate at which biodiesel can be blended into said distillate stream so as not to exceed the maximum biodiesel content; and (g) modulating said regulating valve to blend biodiesel into said distillate stream at or below said maximum blending rate.

In a fourth principal embodiment the invention provides an automated system for blending biodiesel into a distillate stream so as not to exceed a maximum biodiesel content comprising: (a) a distillate stream having a distillate stream flow rate; (b) a supply of biodiesel in liquid communication with said distillate stream, separated from said distillate stream by a regulating valve that is under the control of a central processing unit; (c) a maximum biodiesel content for said distillate stream accessible by said central processing unit; (d) an analyzer for measuring an actual biodiesel content of said distillate stream, upstream and/or downstream of said valve; (e) means for transmitting said actual biodiesel content to said central processing unit; (f) means for calculating in said central processing unit a maximum rate at which biodiesel can be blended into said distillate stream so as not to exceed the target biodiesel content; and (g) means for periodically modulating said regulating valve to blend biodiesel into said distillate stream at or below said maximum blending rate.

Subembodiments

The measurement of biodiesel in the distillate stream, whether performed upstream or downstream of the biodiesel addition point on the distillate line, can be performed using any automated analytical method including near infra-red spectroscopy, mid infra-red spectroscopy, gas chromatography or mass spectroscopy. In a preferred subembodiment, the biodiesel content is measured using mid infra-red spectroscopy, according to ASTM D7371, EN14078, or ASTM D7861. Mid Infrared (400-4000 cm$^{-1}$) was selected for these standards because it covers the fingerprint band of IR response for biodiesel, including 1745 cm$^{-1}$ for the C=O bond, which is not found in diesel. However, in an even more preferred embodiment, the biodiesel content is measured by Near Infrared (4000-12,500 cm$^{-1}$) Spectroscopy. Near Infrared Spectroscopy is based on the overtones and combinations of vibrational frequencies of the fingerprint bonds of biodiesel.

In a particularly preferred subembodiment, the mid or near infra-red spectroscopy is performed in a machine calibrated to measure biodiesel content in Grade No. 1-D S15 diesel fuel, Grade No. 2-D S15 diesel fuel, Grade No. 1-D S500 diesel fuel, Grade No. 2-D S500 diesel, Grade No. 1-D S5000 diesel fuel, Grade No. 2-D S5000 diesel fuel, Grade No. 4-D diesel fuel, or a combination of these grades, or all of these grades.

Near IR analytical machines which can be adapted for automated measurements of biodiesel content include the FTPA 2000—HP360 FTIR Field Mountable Single Process Analyzer™ by ABB Analytical Measurement, Quebec, Canada, the near infra-red Biodiesel Analyzer™ by LT Industries, Inc, Gaithersburg, Maryland, and the Matrix-F FT-NIR Spectrometer™ by Bruker Corporation, Billerica, Massachusetts.

The biodiesel blending rate can be calculated based on biodiesel measurements taken upstream of the biodiesel addition point according to the following formula:

$$(BD_{FR}) = (D_{FR}(\text{target \%} - D_{BD\%}))/(1 - \text{target \%})$$

where:
$BD_{FR}$=Biodiesel flow rate
$D_{FR}$=Distillate flow rate upstream of addition point
$D_{BD\%}$=Distillate biodiesel % upstream of addition point Alternatively, the biodiesel blending rate can be calculated using a feedback control process based on biodiesel measurements taken downstream of the biodiesel addition point. In a preferred embodiment, however, biodiesel measurements are taken upstream and downstream of the biodiesel addition point; the upstream measurement is used to determine the biodiesel blending rate; and the downstream measurement is used to confirm the content of the blended stream. In this embodiment, a signal associated with the actual downstream biodiesel content is preferably generated and communicated to an IPU to indicate whether the actual downstream biodiesel content has achieved the target biodiesel content at a particular time point.

The method is particularly well adapted to the generation of records which document the rate of addition or amount of biodiesel in the distillate line. Thus, in one subembodiment the measuring step occurs upstream of the biodiesel addition point, and the method further comprises measuring an actual downstream biodiesel content in said distillate stream, associating in an information database said resulting actual downstream biodiesel content with a time point to provide associated temporal data; recording said associated temporal data in an informational database; and periodically repeating the process. In one particular subembodiment, the time point is received in said information database from an external source.

The blending will commonly occur along a variable fuel transmission pipe (a/k/a multi-product pipeline) that transmits a plurality of different petroleum types, including gasoline (regular and premium), diesel fuel (various grades), heating oil, and aviation fuel. In this embodiment, the pipeline will eventually intersect with a line that is dedicated to the flow of distillate, and that intersects with the pipeline, or a pipe in fluid communication with the pipeline, at a distillate fuel diversionary valve. Alternatively, the blending can occur inside a pipe that is dedicated to the transmission of the distillate. For example, the blending can occur in a single fuel transmission pipe destined for a distillate fuel storage tank or a single fuel transmission pipe destined for a distillate fuel tanker truck.

In another subembodiment, the methods and systems of the current invention are adapted to ensure that biodiesel is not inadvertently added to fuel types other than distillates. Thus, in one subembodiment, the distillate stream comprises a batch of distillate fuel preceded and succeeded by batches of non-distillate fuel, further comprising ceasing any biodiesel blending as said non-distillate fuel passes said valve.

In another subembodiment, the distillate stream comprises a batch of distillate fuel preceded and succeeded by batches of non-distillate fuel, further comprising monitoring said distillate stream for the identity of said batch at said valve, and only blending biodiesel into said distillate stream when said batch of distillate fuel is passing by said valve. A particularly preferred method of determining the identity of the fuel in the pipeline is density, and such method can be performed as part of the blending operation, or density measurements furnished from an external source.

In one particular subembodiment, the identity of the fuel inside the pipeline is determined by measuring the density of the stream, further comprising providing a range of densities associated with distillate fuel, and only blending biodiesel into said distillate stream when said stream falls within the range of specific gravities associated with distillate fuel. In still further subembodiments, the identity of the fuel inside the pipeline is determined based on a batch code associated with the stream that is flowing past the valve. In this subembodiment, the batch code of the fuel traveling past the valve is commonly furnished by an external source, and associated with a fuel type recorded in a database maintained in the systems and methods of the present invention.

In another subembodiment, the distillate stream comprises a batch of diesel fuel preceded or succeeded by a batch of a fuel which is incompatible with biodiesel such as aviation turbine fuel. Various strategies can be used to ensure that biodiesel does not contaminate the aviation turbine fuel. For example, the user of the system might designate a front or end segment of the distillate stream as "blend free," thereby creating a buffer between the distillate with which biodiesel has been mixed and the interface between the distillate and the aviation fuel. Thus, in one subembodiment the methods of the current invention further comprise establishing a buffer of distillate fuel at an interface between said diesel fuel and said aviation fuel, and ceasing biodiesel blending in said buffer. The buffer can be based on time or volume of fluid flow, but will always be defined to preclude any mixing of biodiesel into the abutting stream with which the biodiesel is incompatible.

Another strategy for preventing contamination is to insert a physical buffer between the distillate and aviation fuel streams, and to assign a separate batch code to the buffer to monitor its progress past the regulating valve. Thus, in another subembodiment, the distillate stream is preceded or succeeded by an aviation turbine fuel stream and a buffer stream interposed between said distillate stream and said aviation turbine fuel stream, further comprising (a) providing a distillate stream batch code for said distillate stream; (b) associating said distillate stream batch code with a front end and a tail end of said distillate stream on said central processing unit; (c) providing a buffer stream batch code for said buffer stream; (d) associating said buffer stream batch code with a front end and a tail end of said buffer stream on said central processing unit; (e) monitoring the progress of said distillate stream and said buffer stream on said central processing unit relative to said regulating valve; and (f) executing programmable logic on said central processing unit based on the progress of said distillate and buffer streams to prevent blending of biodiesel into said buffer stream as the buffer stream flows past said regulating valve. The regulating valve can be under the control of the same central processing unit as the central processing unit on which monitoring step (e) and executing step (f) are performed, or a different central processing unit. When the central processing units are different, the method will further comprise the first central processing unit signaling the regulating valve to stop blending into the distillate stream in response to a corresponding signal from the second central processing unit to the first central processing unit.

Still another method of preventing contamination of the aviation fuel stream by the biodiesel involves monitoring for indicia of aviation turbine fuel, and preventing blending when the stream passing the regulating valve has physical properties corresponding to those indicia. Thus, in still another subembodiment, wherein the distillate stream is preceded or succeeded by an aviation turbine fuel stream, the method further comprises: (a) providing an indicia of aviation turbine fuel corresponding to a physical property of aviation turbine fuel, accessible by the central processing unit; (b) monitoring the distillate stream for the physical property, and transmitting the physical property to the central processing unit; and (c) executing programmable logic on said central processing unit to: (i) compare the physical property with the indicia, and (ii) communicate to the regulating valve to stop blending biodiesel when the physical property matches the indicia. Preferred indicia for this subembodiment include density, pour point and sulfur content, and combinations thereof.

The flow rate of distillate can remain unchanged over time or it can vary. When the rate varies, measurements will preferably be taken of the flow rate in real time, and the biodiesel addition rate calculated based on the actual flow rate of the distillate stream.

The rate at which the biodiesel is added to the distillate is preferably determined by the relative pressures of the biodiesel and distillate streams at the point of addition, with the biodiesel stream pressure higher than the distillate stream pressure. The pressure of the biodiesel stream is preferably under the control of a coordinated pump and valve system, as shown in greater detail in the figure hereto.

Chemometrics

"Chemometrics" is a term applied to the generic discipline of using computers and mathematics to derive meaningful chemical information from samples of varying complexity. (Workman, J. J., Jr (2008) NIR spectroscopy calibration basic. In: Burns, D. A. and Ciurczak, E. W. (eds), Handbook of Near-Infrared Analysis, 3rd edn. CRC Press, Boca Raton, FL) In chemometrics, a computer is tasked with interpreting NIR spectra from a plurality of samples using a variety of multivariate mathematical techniques. These techniques are used to produce a mathematical calibration model.

In routine NIR analysis, the spectra should be pretreated to enhance informative signals of the interested components and reduce uninformative signals as much as possible. (Pantoja P A et al., Application of Near-Infrared Spectroscopy to the Characterization of Petroleum, in Analytical Characterization Methods for Crude Oil and Related Products, First Edition. Edited by Ashutosh K. Shukla. Published 2018 by John Wiley & Sons Ltd.) Smoothing, multiplicative scatter correction, mean centering, and Savitzky-Golay derivation are commonly applied to pretreat the spectra before modeling in order to remove the scattering effect created by diffuse reflectance and to decrease baseline shift, overlapping peak, and other detrimental effects on the signal-to-noise ratio. (Boysworth, M. K. and Booksh, K. S. (2008) Aspects of multivariate calibration applied to near-infrared spectroscopy. In: Burns, D. A. and Ciurczak, E. W. (eds), Handbook of Near-Infrared Analysis, 3rd edn. CRC Press, Boca Raton, FL.)

NIR spectra are ultimately calibrated to relate the observed spectra, in a predictive manner, to a property of interest. With calibration it is possible to predict relevant physicochemical properties of an unknown hydrocarbon that compare accurately with reference information on these properties. In the process of this invention, the reference information is generated from pipeline samples taken simultaneously with spectral information on the pipeline to generate a chemometric dataset. The main calibration methods, as described by López-Gejo et al., 2008, include principal component analysis (PCA), partial least squares (PLS) regression, and artificial neural networks (ANNs). (López-Gejo, J., Pantoja, P. A., Falla, F. S., et al. (2008) Electronical and vibrational spectroscopy. In: Petroleum Science Research Progress, Publisher, Inc., 187-233)

Thus, in other methods and systems of the present invention, one or more physical property values are obtained by generating a spectral response of said distillate stream using absorption spectroscopy with a near infrared analyzer, and comparing said spectral response to a chemometric dataset specific for said physical property value in said distillate stream.

In further methods and systems of the present invention, the chemometric dataset is built by taking two or more samples of said distillate stream from a pipeline; measuring said physical property of the samples offline; simultaneously with taking the two or more samples, obtaining a spectral response of the distillate in the pipeline using absorption spectroscopy with a near infrared analyzer; and correlating the spectral response with the measured physical property of the samples. The foregoing methods apply to any type of distillate fuel, with measurements taken upstream or downstream of the injection valve.

EXAMPLES

In the following examples, efforts have been made to ensure accuracy with respect to numbers (e.g., amounts, temperature, etc.) but some errors and deviations should be accounted for. The following examples are put forth so as to provide those of ordinary skill in the art with a complete disclosure and description of how the methods claimed herein are made and evaluated, and are intended to be purely exemplary of the invention and are not intended to limit the scope of what the inventors regard as their invention.

Example 1: Layout of Process Components

The relative locations of the sampling, measuring and injection steps and systems is a matter of practical convenience. In a particular embodiment, they are located in close proximity to one another. For example, the sampling, measuring and injection systems can be housed on a discreet, permanently mounted skid or platform.

Alternatively, the sampling, measuring and injection steps and systems are located in different locations. For example, the sampling and measuring steps can occur at any location upstream of the injection. Furthermore, the injection step can occur either at a single location or at multiple locations. Referring to FIG. 1, there can be seen a distillate line 1 originating from a distillate source 2, and ultimately flowing to the distillate destination 3. A distillate flow meter 4 is also present on the distillate line for determining the rate of distillate through distillate line 1.

FIG. 1 further depicts a biodiesel line 5 in fluid communication with distillation line 1, originating from a biodiesel source 6. Biodiesel line 5 enters the system through biodiesel pump 7 which delivers biodiesel at a constant pressure to control valve 8 and eventually to biodiesel junction 9. A biodiesel flow meter 10 is also present on biodiesel line for determining the flow rate of biodiesel through biodiesel line 5.

In a preferred embodiment, a sample of distillate is periodically withdrawn from distillate line 1 through sample line 11 at sample junction 12, or sample line 13 at sample junction 14, or both. The sample of distillate is routed to a sample valve 15 through the action of sample pump 16, and subsequently conditioned in sample conditioner 17 before delivery and analysis in extracted sample analyzer 18. After the sample is analyzed, the sample is preferably returned to distillate line 1 through sample return line 19 and sample return junction 20.

As an alternative to the sample withdrawal procedure described in the preceding paragraph, sample probes 21 and/or 22 can be installed on distillate line 1 for periodically analyzing the distillate line using sample probe analyzer 23.

The entire system, except for the rate of flow through distillate line 1, is under the control of IPU 24. IPU 24 is in informational communication with distillate flow meter 4, biodiesel flow meter 10, biodiesel control valve 8, sample valve 15, extracted sample analyzer 18, and sample probe analyzer 23. In practice, IPU 24 periodically actuates valve 15 to deliver a fresh sample of distillate to extracted sample analyzer 18, at a frequency that does not exceed the time required to analyze a sample by analyzer 18. Sample analyzer 18 determines the biodiesel content in distillate line 1 at sample junction 12 and/or 14, and communicates the results of the analysis to IPU 24, which calculates the rate at which biodiesel can be added to the distillate source to achieve a predetermined biodiesel content, based on the content of biodiesel in the distillate stream and the distillate flow rate obtained from distillate flow meter 4, and adjusts biodiesel control valve 8 to cause biodiesel to be injected through biodiesel junction 9 at the flow rate calculated by IPU 24.

As an alternative to the sample extraction method described in the preceding paragraph, CPU 24 can receive the biodiesel content of the distillate stream through sample probes 21 and/or 22 located upstream and/or downstream of biodiesel junction 9, based on data communicated by sample probe analyzer 23.

IPU 24 can base its biodiesel flow rate calculation on the biodiesel content of the distillate stream either upstream of biodiesel junction 9, or downstream of biodiesel junction 9 using a feedback control mechanism. In a preferred embodiment, IPU 24 bases its calculation on the biodiesel content of the distillate stream 1 upstream of biodiesel junction 9, and it also performs an analysis of the biodiesel content of distillate stream 1 downstream of biodiesel junction 9, but only for quality control and reporting purposes.

Example 2: Physical Property Calculations

Biodiesel Content

The biodiesel content of the distillate stream can be measured using mid infra-red spectroscopy according to ASTM method D7371 or D7861, when blending into a diesel stream. These methods can be readily adapted to the analysis of biodiesel content in other distillate streams such as heating oil or kerosene by methods well known to workers skilled in the art.

In method D7371, a sample of diesel fuel, biodiesel, or biodiesel blend is introduced into a liquid attenuated total reflectance (ATR) sample cell. A beam of infrared light is imaged through the sample onto a detector, and the detector response is determined. Wavelengths of the absorption spectrum that correlate highly with biodiesel or interferences are selected for analysis. A multivariate mathematical analysis converts the detector; response for the selected areas of the spectrum from an unknown to a concentration of biodiesel. The test method preferably uses Fourier transform mid-IR spectrometer with an ATR sample cell. The absorption spectrum is used to calculate a partial least square (PLS) calibration algorithm.

In method D7861-14, a sample of diesel fuel or biodiesel blend (BXX) is placed onto a HATR sample crystal. Infrared light is imaged through the sample, then through the LVF and finally onto a detector array. The LVF separates the infrared light into specific wavelengths so that the response of the detector array generates an infrared spectrum. Spectral corrections are performed to eliminate interferences caused by diesel and bio-diesel variations. A wavelength region of the absorption spectrum that correlates highly with biodiesel is selected for analysis. The area of the selected region is determined. A calibration curve converts the selected area of an unknown sample to a concentration of biodiesel. The test method preferably uses a LVF array based mid-infrared spectrometer with an HATR crystal. The absorption spectrum is used to calculate a calibration curve.

Density

A preferred method of measuring the density of a distillate stream is reported as ASTM standard method 4052, conducted at 15° C., using a suitable commercially available density measuring device. A particularly suitable range of density for the distillate stream in this application, when measured according to the foregoing method, is from 800 to 876 kg/m$^3$. Alternatively, or in addition, density can be measured in terms of specific gravity or its corollary, API gravity, where the specific gravity of the distillate stream is preferably from 0.800 to 0.876, and the API gravity of the distillate stream is preferably from 45.4 to 30.0. API gravity and specific gravity are related according to the following formulae:

$$\text{API Gravity at } 60° \text{ F.} = (141.5/SG) - 131.5$$

$$\text{Specific Gravity at } 60° \text{ F.} = 141.5/(\text{API Gravity} + 131.5)$$

The measurement of density according to this invention gives rise to several distinct embodiments. In one embodiment, the density of fluid flowing through a pipeline is continually measured, and the biodiesel is injected into the fuel when the density of the fluid corresponds to the density of distillate, but only when the density of the fluid corresponds to the density of distillate, and not when the fluid corresponds to the density of a non-distillate fuel.

Example 3: Biodiesel Injection by Two Valve System, and Autonomous Control

Significantly, the injection unit described in any of the foregoing embodiments may comprise two valves. One valve is an on/off valve located between the distillate stream and the biodiesel stream. This valve can prevent distillate from entering the biodiesel injection unit. The second valve is a modulating valve that controls the flow of biodiesel towards the first valve. The second valve controls the rate of flow of biodiesel by modulating both the pressure of the biodiesel stream passing through the valve as well as the size of the orifice through which the biodiesel stream flows. The modulating valve and/or the on/off valve may be under the control of a process control unit, which varies the blend ratio to attain a desired biodiesel content, based on the biodiesel content of distillate entering the biodiesel injection unit and the desired biodiesel content of the blended distillate. A biodiesel addition rate may then be calculated based upon the blend ratio and the rate of flow in the distillate stream, and the modulating valve may be opened or closed to allow biodiesel addition at the rate thus calculated. The valves may also be under the control of one or more remote information processing units.

Example 4: Databases and Information Processing Unit

Additionally, any of the foregoing embodiments may comprise one or more informational databases and an information processing unit (IPU). In operation, the IPU retrieves allowable blending parameters (i.e. biodiesel limits) from the informational database and, based on the biodiesel content of the distillate stream, calculates the blend ratio and/or blend rate based upon the relevant blending parameters. As used throughout the present application, the term "retrieve" includes both retrieving data and receiving data from another source.

The IPU may also process various results of the blending operation and store the results on the informational database. For example, the IPU can transmit to the database for recording the upstream physical properties of the distillate stream, the downstream physical properties of the distillate stream, or the physical properties of the biodiesel stream, and can associate such properties with discreet time points or segments. Such physical properties include, for example, density, volatility, temperature and flow rate.

In other embodiments, the IPU receives or retrieves data from an IPU under the control of a different entity. Thus, for example, the pipeline operator may periodically measure the flow rate, density or temperature of distillate flowing through the pipeline, and transmit (or make accessible) such information to the operator of the biodiesel injection unit for use in the IPU.

Example 5: Adjustability of Blend Rates

The distillate stream of the foregoing embodiments may have a distillate flow rate that does not vary over time, and therefore, the blend rate can be calculated based upon a pre-set distillate flow rate. Alternatively, the distillate stream may have a distillate flow rate that varies over time, and therefore, utilization of the invention will further comprise periodically determining the distillate flow rate through the pipeline, and periodically recalculating the biodiesel blend rate based upon the distillate flow rate and a calculated blend ratio. Specifically, the systems of the present invention may further comprise one or more IPUs in informational communication with upstream biodiesel content sensors, logically programmed to calculate a blend ratio and blend rate based upon the biodiesel content and volumetric flow rate of said distillate stream, and for communicating said calculated blend ratio and calculated blend rate to said biodiesel injection unit; wherein said biodiesel injection unit periodically receives said calculated blend ratio and calculated blend rate from said one or more IPUs, and adjusts the actual blend ratio and actual blend rate to coincide with said calculated blend ratio and calculated blend rate.

Example 6: Remote and Local Control

Any of the foregoing data, including the target biodiesel content, biodiesel content measurements, and specific gravity measurements can be stored in a database accessible to a remote location through a dedicated or Internet connection. Furthermore, any of the data or signals encoding the data can be transmitted via dedicated or Internet connections between the components of the system.

The foregoing embodiments of the invention may further include a manual switch to shut down the system. The manual switch may operate to turn off an on/off valve that may be located between the distillate and biodiesel streams. The embodiments of the invention may also include an IDB for storing data accessible to an IPU with access to an Internet connection.

Example 7: Placement Relative to Pipeline and Storage Facility

The biodiesel injection units described in the foregoing embodiments of the invention may be placed on a skid or platform. The invention may be located anywhere downstream of a distillate source. The invention may also be located at a distillate tank farm, either before the distillate stream is introduced to a tank, or after the distillate stream is withdrawn from the tank. The tank farm may be a terminal distillate tank farm, an intermediate distillate tank farm, or a combined use tank farm.

Throughout this application, various publications are referenced. The disclosures of these publications in their entireties are hereby incorporated by reference into this application in order to more fully describe the state of the art to which this invention pertains. It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An automated method of blending biodiesel into a distillate stream comprising: a) providing a distillate stream comprising diesel fuel as defined by ASTM D975 or heating oil as defined by ASTM D396; b) providing a supply of biodiesel in liquid communication with said distillate stream, separated from said distillate stream by a regulating valve; c) providing a maximum biodiesel content for said distillate stream; d) periodically measuring an actual biodiesel content in said distillate stream, either upstream or downstream of said regulating valve; and e) modulating said regulating valve based on the periodic measurements to blend biodiesel into said distillate stream so as not to exceed the maximum biodiesel content; wherein the regulating valve is under the control of a central processing unit.

2. The method of claim 1, wherein said actual biodiesel content is obtained by generating a spectral response of said distillate stream using absorption spectroscopy with a near infrared analyzer, and comparing said spectral response to a chemometric dataset specific for said value in said distillate stream.

3. The method of claim 2, wherein said chemometric dataset is built by taking two or more samples of said distillate from a distillate stream; measuring said physical property of the samples offline; simultaneously with taking the two or more samples, obtaining a spectral response of the distillate in the distillate stream using absorption spectroscopy with a near infrared analyzer; and correlating the spectral response with the value of the samples.

4. The method of claim 1, wherein said distillate stream comprises a batch of distillate fuel preceded and succeeded by a batch of non-distillate fuel, further comprising ceasing any biodiesel blending as said non-distillate fuel passes said valve.

5. The method of claim 1, wherein said distillate stream comprises a batch of diesel fuel preceded or succeeded by a batch of aviation fuel, further comprising establishing a buffer of distillate fuel at an interface between said diesel fuel and said aviation fuel, and ceasing biodiesel blending in said buffer.

6. The method of claim 1, wherein said measuring step (d) occurs upstream of said valve.

7. The method of claim 1, wherein said measuring step (d) occurs downstream of said valve.

8. The method of claim 1, wherein said blending occurs inside a variable fuel transmission pipe that transmits diesel fuel and aviation fuel.

9. The method of claim 1, wherein said biodiesel consists essentially of mono-methyl esters of fatty acids derived from vegetable oils, animal fats or both.

10. The method of claim 1, wherein said distillate stream flow rate varies over time, and step (e) is performed based upon the distillate stream flow rate.

11. An automated method of blending biodiesel into a distillate stream comprising: a) providing a distillate stream; b) providing a supply of biodiesel in liquid communication with said distillate stream, separated from said distillate stream by a regulating valve; c) providing a maximum biodiesel content for said distillate stream; d) periodically measuring an actual biodiesel content in said distillate stream, either upstream or downstream of said regulating valve; e) modulating said regulating valve based on the periodic measurements to blend biodiesel into said distillate stream and not exceed the maximum biodiesel content; wherein the distillate stream is preceded or succeeded by an aviation turbine fuel stream, further comprising: f) providing an indicia of aviation turbine fuel corresponding to a physical property of aviation turbine fuel, accessible by a central processing unit; g) monitoring the distillate stream for the physical property, and transmitting the physical property to the central processing unit; and h) executing programmable logic on the central processing unit to: i) compare the physical property with the indicia, and ii) communicate to the regulating valve to stop blending biodiesel when the physical property matches the indicia.

12. The method of claim 11, wherein said indicia are selected from the group consisting of density, pour point and sulfur content, and combinations thereof.

13. An automated method of blending biodiesel into a distillate stream comprising: a) providing a distillate stream; b) providing a supply of biodiesel in liquid communication with said distillate stream, separated from said distillate stream by a regulating valve; c) providing a maximum biodiesel content for said distillate stream; d) periodically measuring an actual biodiesel content in said distillate stream, either upstream or downstream of said regulating valve; e) modulating said regulating valve based on the period measurements to blend biodiesel into said distillate stream and not exceed the actual biodiesel content; wherein said distillate stream comprises a batch of distillate fuel preceded and succeeded by batches of non-distillate fuel, further comprising monitoring said distillate stream for the identity of said batch at said valve, and only blending biodiesel into said distillate stream when said batch of distillate fuel is passing by said valve; wherein the regulating valve is under the control of a central processing unit.

14. The method of claim 13, wherein the identity of said batch is determined by measuring the density of the stream.

15. The method of claim 13, wherein the identity of said batch is determined by measuring the density of the stream, further comprising providing a range of densities associated with distillate fuel, and only blending biodiesel into said distillate stream when said stream falls within the range of densities.

16. The method of claim 13, wherein the identity of said batch is determined based on a batch code associated with the stream that is flowing past the valve.

17. An automated method of blending biodiesel into a distillate stream comprising: a) providing a distillate stream; b) providing a supply of biodiesel, comprising mono-alkyl esters of fatty acids derived from vegetable oils, animal fats or both, in liquid communication with said distillate stream, separated from said distillate stream by a regulating valve; c) providing a maximum biodiesel content for said distillate stream; d) periodically measuring an actual biodiesel content in said distillate stream, either upstream or downstream of said regulating valve; and e) modulating said regulating valve based on the periodic measurements to blend biodiesel into said distillate stream so as not to exceed the maximum biodiesel content; wherein the regulating valve is under the control of a central processing unit.

* * * * *